United States Patent [19]

Kouno et al.

[11] Patent Number: 4,747,153

[45] Date of Patent: May 24, 1988

[54] DEVICE AND METHOD FOR PATTERN RECOGNITION

[75] Inventors: Hidehiko Kouno, Ibaragi; Toshiaki Amano; Takayuki Aoki, both of Kanagawa, all of Japan

[73] Assignees: Japan as Represented by Director General of Agency of Industrial Science and Technology; Amada Company, Limited, both of Japan

[21] Appl. No.: 709,194

[22] Filed: Mar. 7, 1985

[30] Foreign Application Priority Data

| Mar. 8, 1984 [JP] | Japan | 59-44670 |
| Mar. 8, 1984 [JP] | Japan | 59-44671 |
| Mar. 8, 1984 [JP] | Japan | 59-44672 |

[51] Int. Cl.$^4$ .................................................. G06K 9/46
[52] U.S. Cl. ...................................... 382/25; 382/18; 382/22
[58] Field of Search .................. 382/16, 25, 26, 28, 382/29, 18, 22; 356/394

[56] References Cited

U.S. PATENT DOCUMENTS

| 3,469,238 | 9/1969 | Partin | 382/18 |
| 3,824,546 | 7/1974 | Kawasaki et al. | 382/28 |
| 4,019,173 | 4/1977 | Kono | 382/28 |
| 4,183,013 | 1/1980 | Agrawala et al. | 382/25 |
| 4,567,610 | 1/1986 | McConnell | 382/18 |

FOREIGN PATENT DOCUMENTS 58-22480 2/1983 Japan ..................................... 382/25

*Primary Examiner*—Leo H. Boudreau
*Attorney, Agent, or Firm*—Wigman & Cohen

[57] ABSTRACT

A method of and apparatus for recognizing the figure pattern of parts used in factories is disclosed in which a pattern input device, such as an ITV camera creates an electrical image of the part which is A/D converted and then stored in binary coded form. The binary coded data is then processed and compared to known stored values, using one or more characteristics of the figure pattern, to determine the identity of the viewed part.

11 Claims, 14 Drawing Sheets

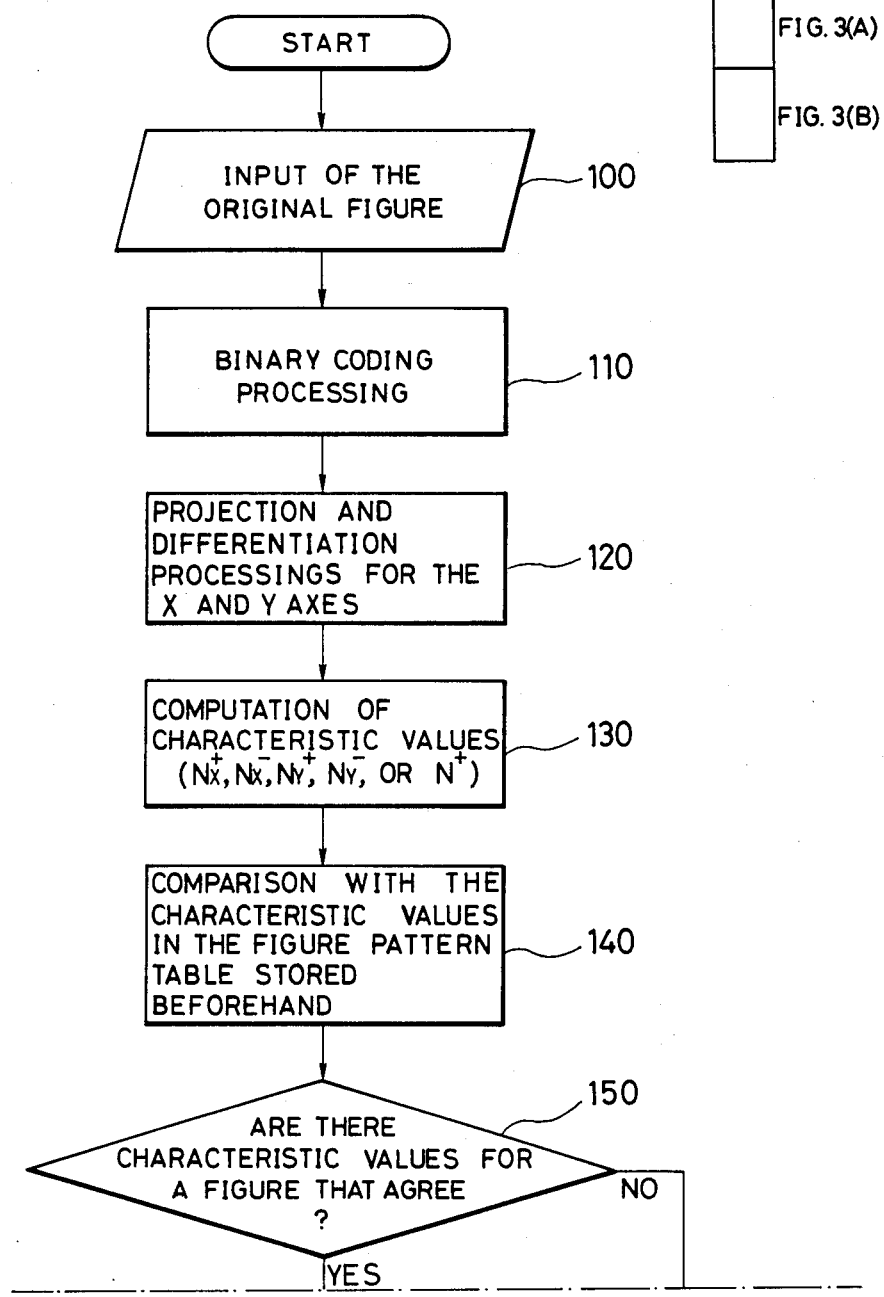

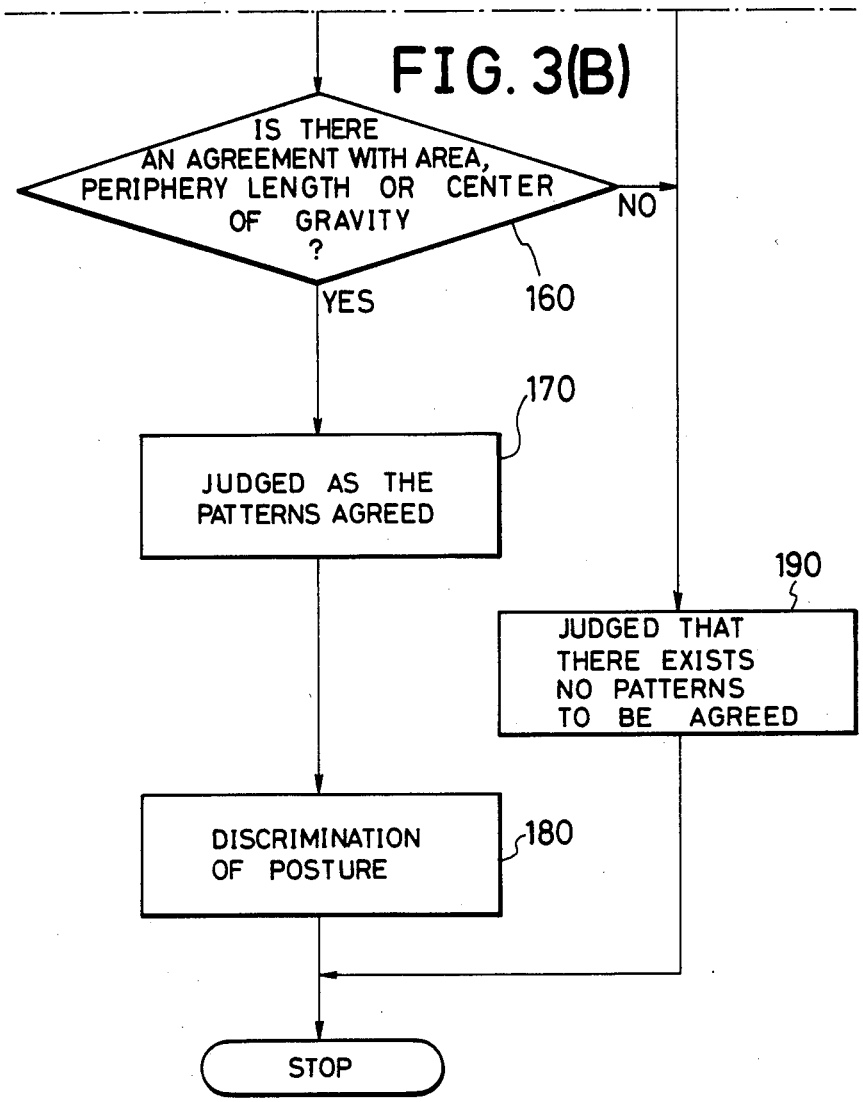

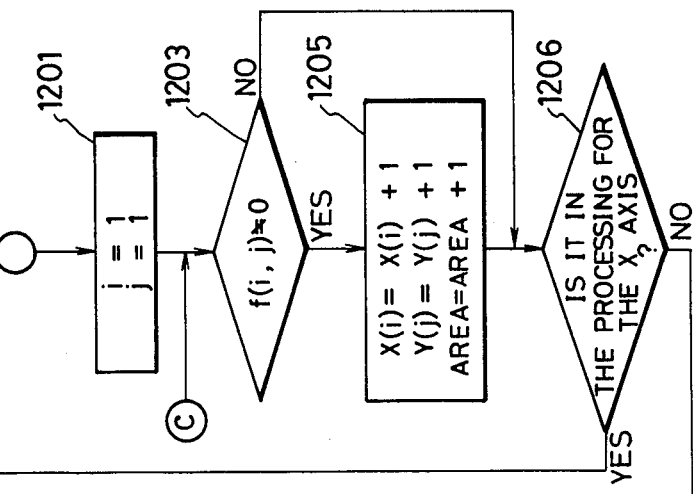
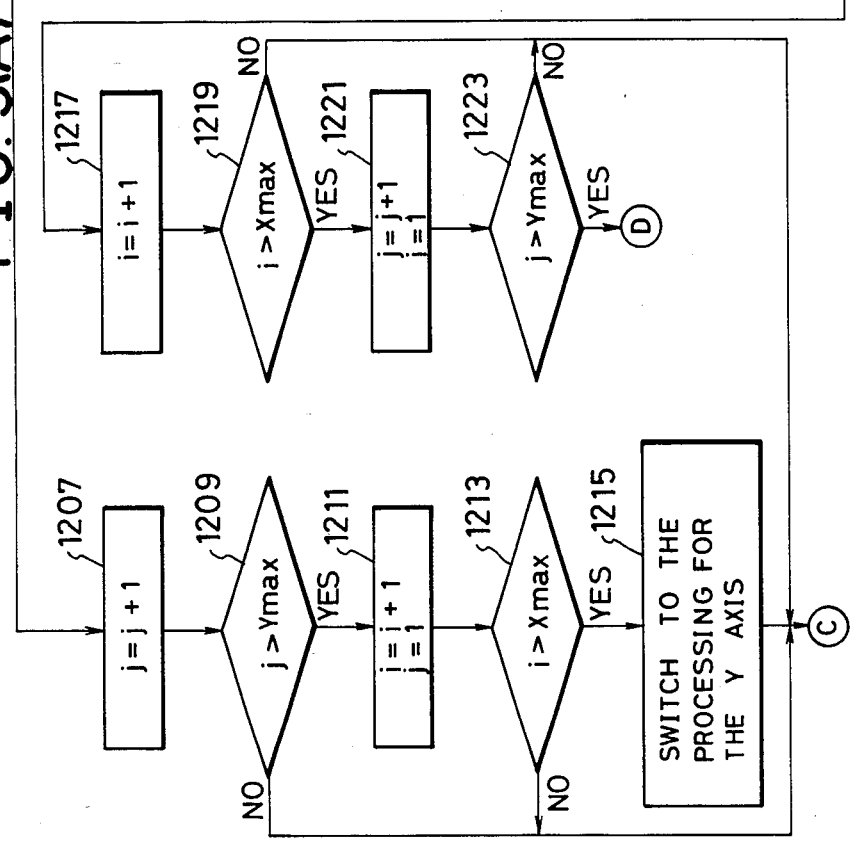

FIG. 6(A)
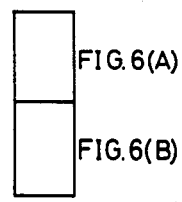
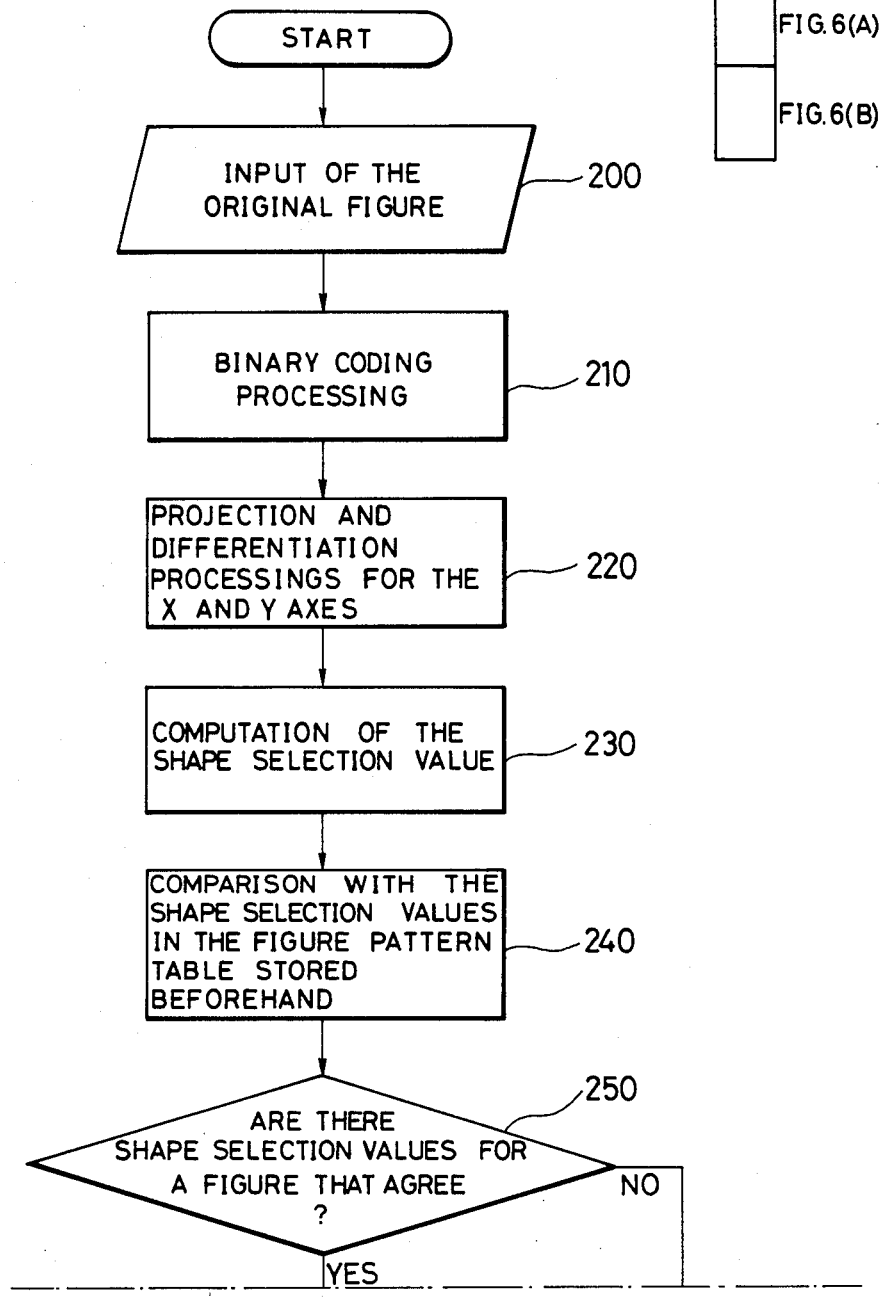

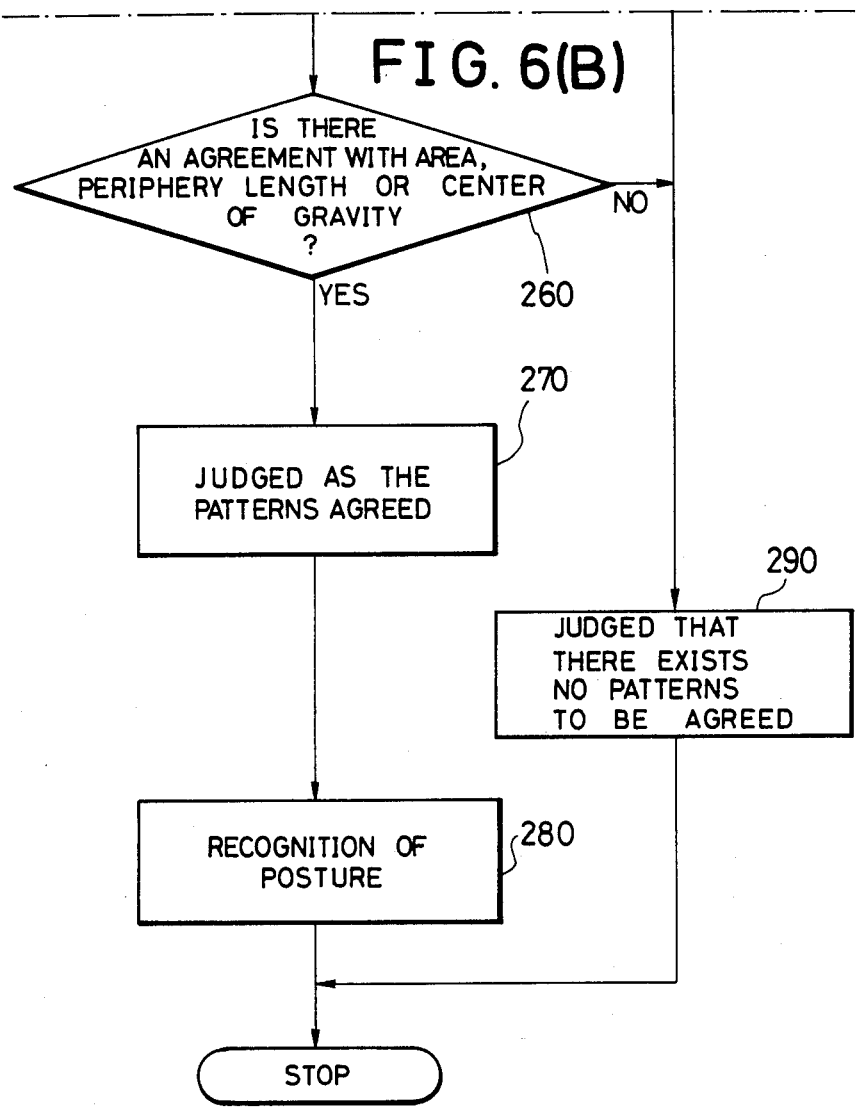

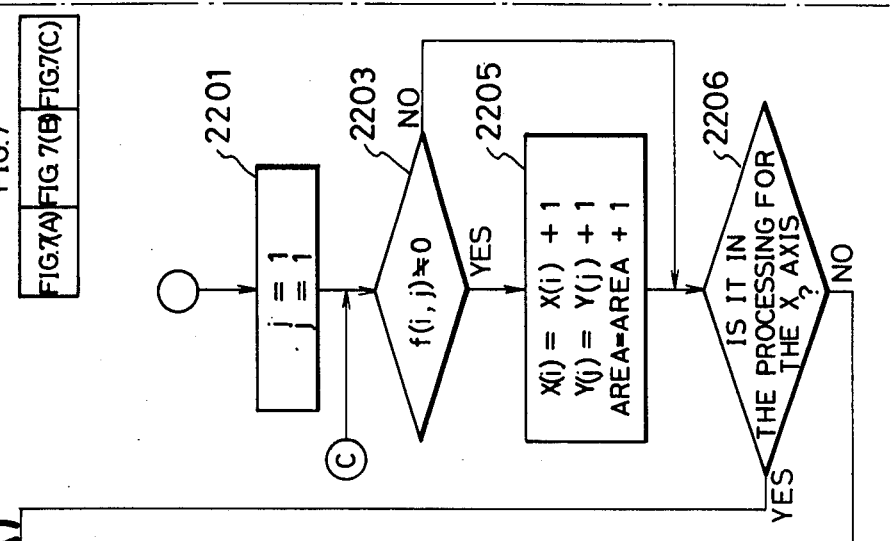
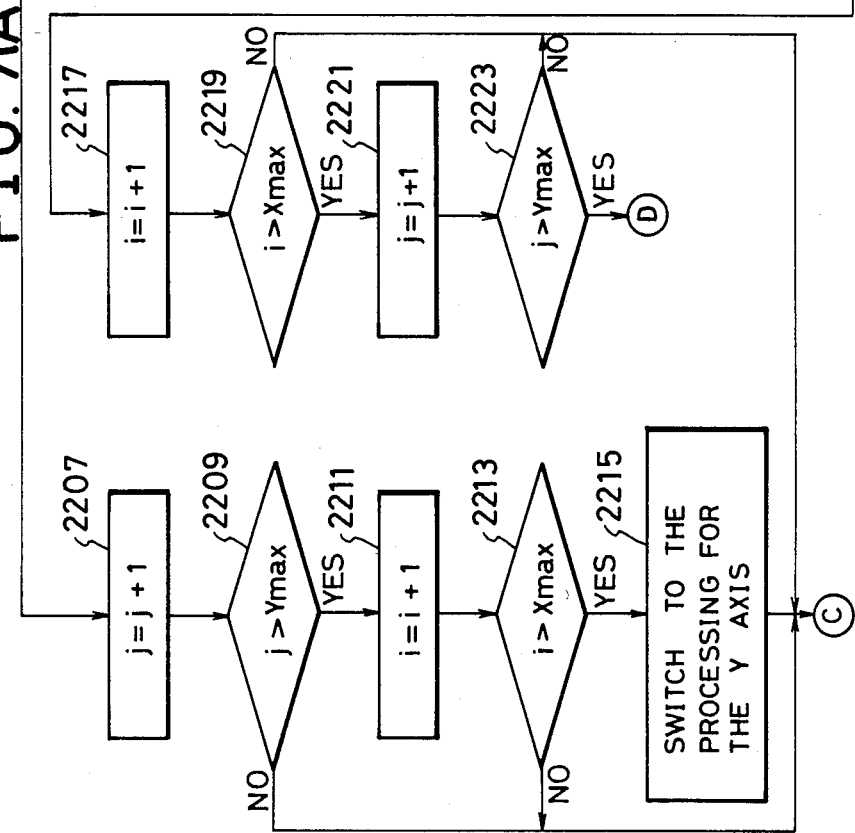

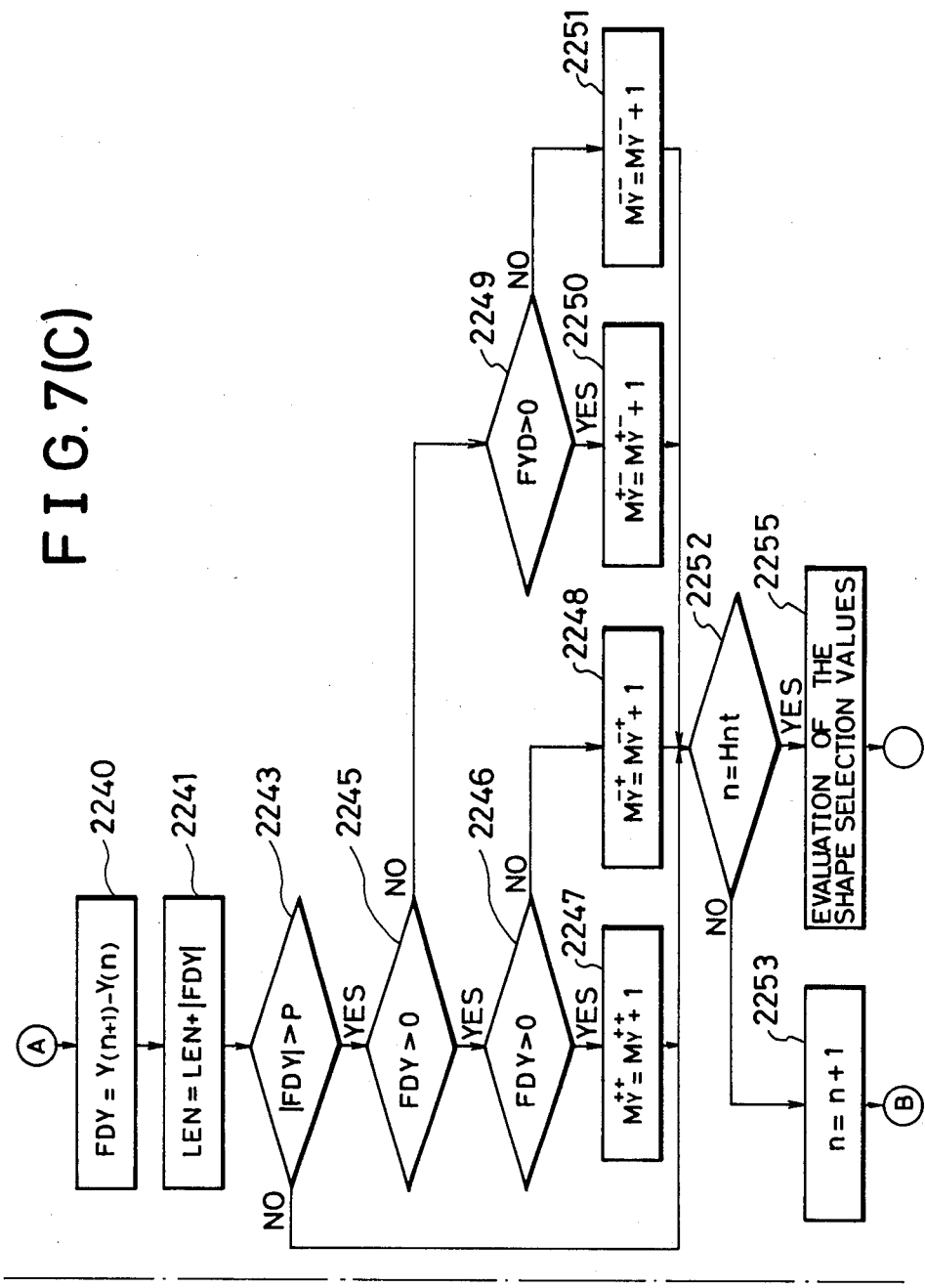

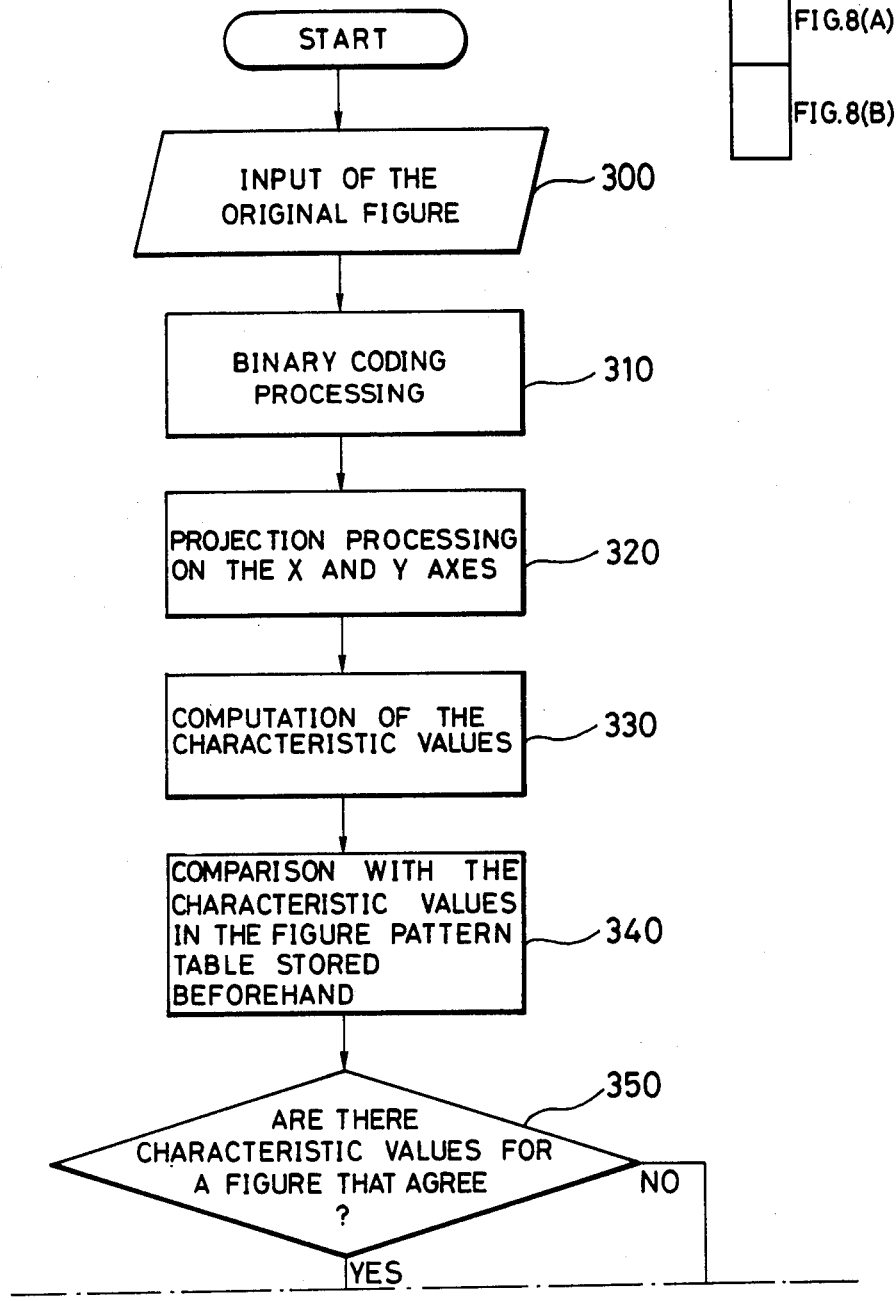

DEVICE AND METHOD FOR PATTERN RECOGNITION

BACKGROUND OF THE INVENTION

The present invention relates to a figure pattern recognition device which is effective for recognizing the shapes and the like of the parts used in production factories.

The punched parts supplied to a bending machine for obtaining sheet metal finished goods generally have simple geometric shapes. Therefore, even in an attempt to extract those parts with prescribed shapes by separating and classifying them from among a mixture of a plurality of kinds of punched parts that are to be supplied to the bending machine, it is not necessary to go through a particularly precise figure pattern recognition. Instead, it is effective to employ a recognition system which permits simple and fast processing, depending upon the patterns of the object figures to be recognized and discerned.

SUMMARY OF THE INVENTION

An object of the present invention is to provide a pattern recognition device which is small in size and simple in structure.

Another object of the present invention is to provide a pattern recognition device adapted for simplifying the processing steps and reducing the processing time.

In order to accomplish the above objects the present invention is arranged to carry out matching of the figure patterns by direct extraction of the characteristic values on the figure patterns through a series of processings of the binary coded figure data for the figure patterns.

BRIEF DESCRIPTION OF THE DRAWINGS

These and other objects, features and advantages of the present invention will become apparent from the following description of the preferred embodiment, taken in conjunction with the accompanying drawings, in which:

FIGS. 3, 3(A) and 3(B) are a flow chart illustrating the processings of the present figure pattern recognition device;

FIGS. 5, 5(A) and 5(B) are a flow chart showing the details of steps 120 and 130 of FIG. 3;

FIGS. 6, 6(A) and 6(B) are a processing flow chart for another embodiment of the figure pattern recognition device in accordance with the present invention;

FIGS. 7, 7(A), 7(B) and 7(C) are a flow chart showing the details of steps 220 and 230 of FIG. 6; and FIG. 8, 8(A) and 8(B) are a processing flow chart for still another embodiment of the figure pattern recognition device in accordance with the present invention.

DETAILED DESCRIPTION OF A PREFERRED EMBODIMENT OF THE INVENTION

Figure 1:
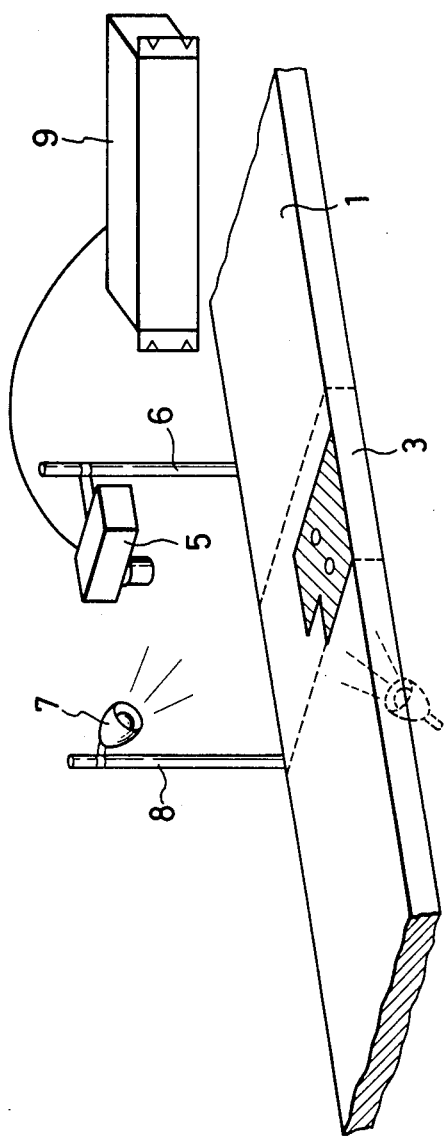
FIG. 1 is a diagram illustrating the construction of an embodiment of the figure pattern recognition device in accordance with the present invention.
Figure 2:
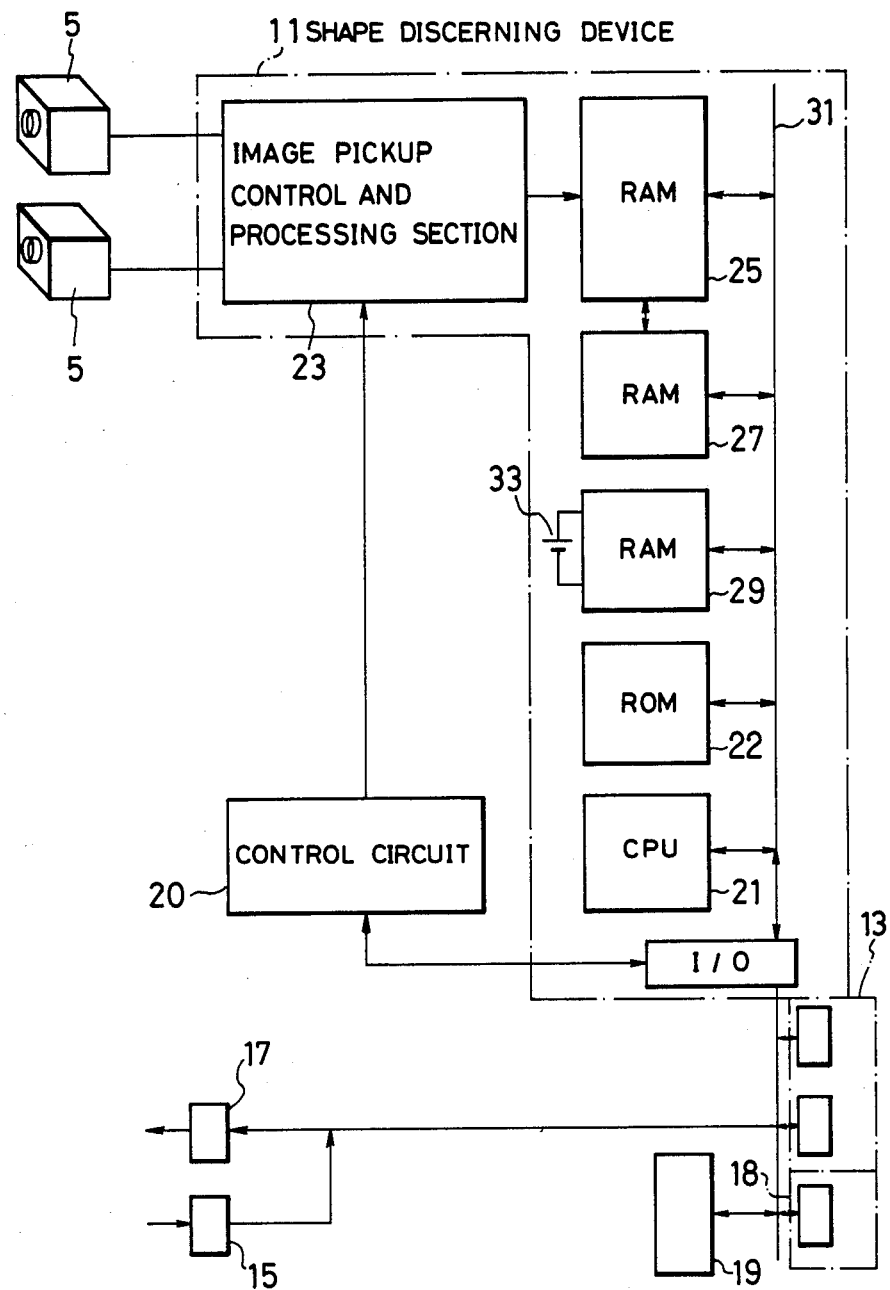
FIG. 2 is a block diagram showing the structure of the figure pattern recognition device as shown in FIG. 1.

To start with, the structure of a figure pattern recognition device will be illustrated by referring to FIGS. 1 and 2. In FIG. 1, a pattern input device 5 is arranged, for example, supported by a support pillar 6 so as to have its image pick up region coincide with the measurement region 3 formed on a part of a sheet metal line 1. The image pickup means 5 is an ITV camera, photoelectric conversion elements arrayed in matrix form, or the like. Further, a light source 7 is arranged supported by a support pillar 8 so as to have the measurement region 3 as its irradiation region. The light source 7 is arranged so as to provide irradiation from the same direction as the direction in which the image pickup means is arranged relative to the measurement region 3, as shown by the solid lines in FIG. 1, when the image pickup is to be done with the image pickup means 5 using the reflected light. The light source 7 is arranged so as to oppose the image pickup means 5 with the measurement region 3 in between, as shown by the broken lines in FIG. 1, when the image pickup is to be done using the transmitted light. On the other hand, the image pickup means 5, which is connected to a processing control means 9, is operated or outputs the signal picked up, under the command signal from the processing control means 9.

The processing control means 9 includes a shape discerning device 11 (see FIG. 2) which possesses various processing and controlling functions in addition to the shape discerning function, a modem (for example using an, RS232 system) 13 for data transmission between the shape discerning device 11 and the outside apparatus by the use of a communication circuit, an input terminal 15, output terminals 17 and 18, an input-output terminal 19 also for exchanging signals with the outside apparatus, and a control circuit 20 for controlling the operation of the image pickup means 5, through an image pickup control and processing section 23 that will be described later, under the control of the processing control part 11. The processing control part 11 includes a central processing unit (CPU) 21, a ROM 22 for storing the processing program of the CPU 21, an image pickup control and processing section 23 connected to at least one of the signal pickup means 5 (there are shown two in FIG. 2), a first through a third RAM 25, 27, and 29 for storing the results of various prescribed processings, the input and output terminals 15, 17, 18, and 19 described earlier, and an I/O port connected to the control circuit 20. The image pickup control and processing section 23, which is connected to the control circuit 20, controls the operation of the image pickup means 5, by receiving a signal, such as the zooming adjustment of the image pickup means 5 or the start signal for image pickup, output by the control circuit 20 under the control of the CPU 21, and by supplying the received signal to the image pickup means 5. The image pickup control and processing part 23 has its output connected to the first RAM 25, and upon receipt of an image pickup signal from the image pickup means 5 (where there are a plurality of image pickup means 5, signal reception is carried out by properly switching among them) it performs the binary coding processing, after A/D conversion, to store the result in the first RAM 25. The second RAM 27 is connected to the CPU 21 and others, via the bus line 31, and stores the results of the differentiation processings done by the CPU 21 for the projections on the X and Y axes that will be described later. The third RAM 29 is also connected to the CPU 21 via the bus line 31, and stores the characteristic values or the shape selection values found by the CPU 21 to be described later. Here, the third RAM 29 is connected to a battery 32 to provide memory content back-up.

When the objects to be recognized have, like the punched parts to be supplied to the bending machine, geometrical shapes, namely, figure patterns constructed into closed loop forms with lines parallel and perpendicular to a certain line as the main constituents, it is easy to align these parts beforehand by means of a guide or the like in supplying them to the machine. Thus, for example, when the parts have a roughly rectangular shape, it is possible to array them to have either one of their sides lie along the guide, though there may remain phase differences of multiples of 90°. Therefore, it will be presumed hereafter that the figure patterns are supplied to the bending machine with their postures already aligned.

For figure patterns thus supplied, the figure pattern is read out first with the pattern input device 5 (step 100 of FIG. 3 to be explained later) to obtain the binary coded figure data (step 110 of FIG. 3 to be explained later).

For the figure data read out by the pattern input device 5 there is carried out an extraction of the characteristic values as will be described below by letting it go through the processings (steps 130 through 190) in the shape discerning device 11 as shown in FIG. 3. This recognition processing has its special feature that it transforms, in the shape discerning device 11, the figure pattern which has been detected by the pattern input device 5 and has been binary coded, to the projected figures on the two axes that are perpendicular to each other. Then the pattern is recognized by the shape matching value that can be determined from an arithmetic operational formula involving the characteristic values which are found as the positive and negative pulse numbers in the differentiated waveforms obtained by differentiating the projected figures.

Further, this recognition processing accomplishes recognition of those figure patterns for which the matching by means of the shape matching value in the above is ineffective, by the use of a second characteristic value such as the periphery length of the figure pattern determined from the total sum of the absolute values of the derivative values in the differentiated waveforms, or the position of the center of gravity of the area of the figure pattern obtained from the binary coded figure pattern.

Figure 4:
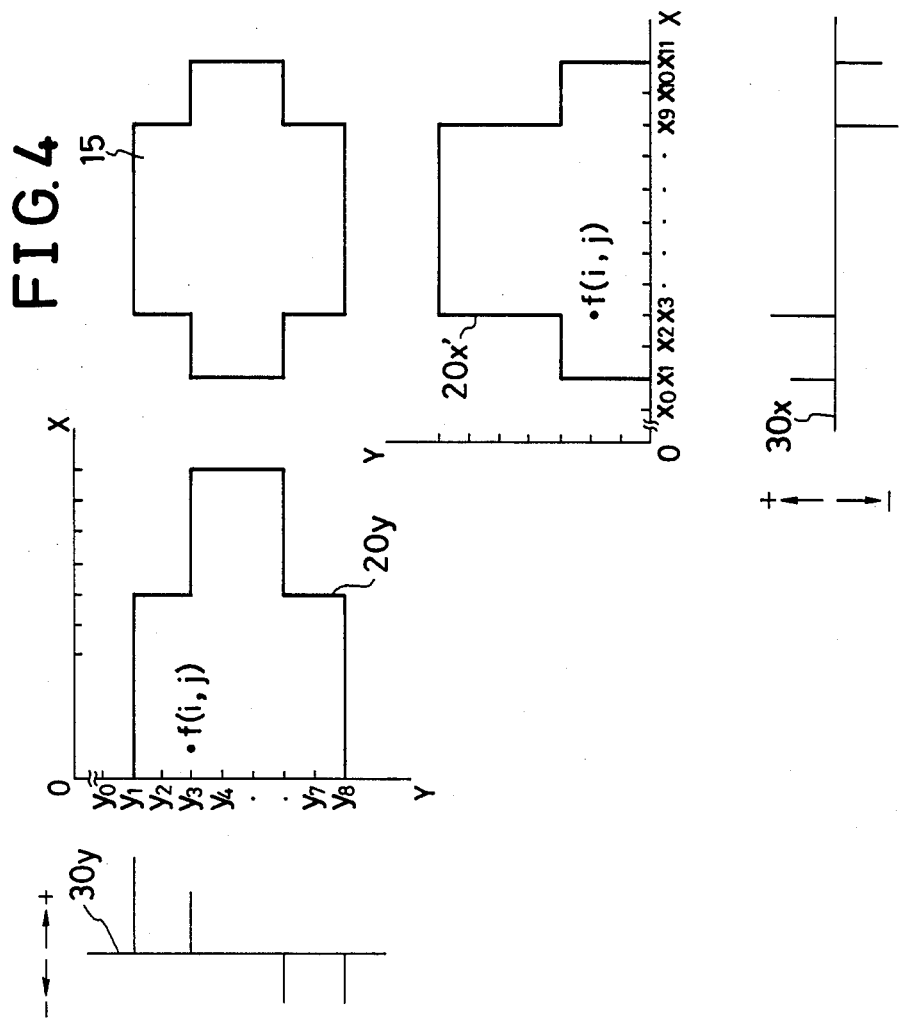
FIG. 4 is an illustration of the figure data processing of the present figure pattern recognition device.

For example, for the binary coded figure data corresponding to a figure pattern 15 as shown in FIG. 4, the figure pattern is transformed first to the projected figures 20X and 20Y on the mutually perpendicular axes X and Y by data processing in the shape discerning device 11, and then the projected figures are differentiated (step 120). The differentiated waveforms 30X and 30Y of the projected figures of the figure pattern 15 on the X and Y axes, respectively are illustrated in FIG. 4.

The differentiated waveforms thus obtained possess different arrays of positive and negative pulses corresponding to the various shape patterns, and hence, it becomes possible to accomplish recognition of the basically geometric figure patterns by focusing attention on this fact.

Then, the characteristic values of a figure pattern are defined as the positive and negative pulse numbers $N_x^+$ and $N_x^-$ in the differentiated waveform of the projected figure on the X axis and similar positive and negative pulse numbers $N_Y^+$ and $N_Y^-$ for the projected figure on the Y axis.

In Table 1 various figure patterns, are shown together with the positive and negative pulse arrays in the differentiated waveforms of the projected figures on the X and Y axes of these figure patterns, and the characteristic values $N_x^+$, $N_x^-$, $N_Y^+$ and $N_Y^-$ computed from these pulse arrays. As seen from that table, the characteristic values for various figure patterns display differences of one kind or another, and hence, it becomes possible to recognize and discern figure patterns by means of the characteristic values.

In carrying out figure pattern recognition by the use of these characteristic values, it becomes possible, as will be shown in what follows, to avoid the necessity of going through a complex matching procedure by employing instead a shape matching value N* that can be determined from an arithmetic operational formula involving the characteristic values.

As a candidate for the arithmetric operational formula one may consider, for example, $$N^* = (N_x^+ + N_x^-) \times (N_Y^+ + N_y^-),$$

$$N^* = (N_x^+ + N_Y^+) \times (N_x^- + N_Y^-),$$

or the like. However, the arithmetic operational formula need not be limited to one of these formulas, but will suffice to be an expression that takes into consideration a more precise characterization of each figure pattern to be recognized.

TABLE 1

| No. | Shape Pattern | Pulse Array (Top Row: X) (Bottom Row: Y) | Characteristic Value $N_x^+, N_x^-$ $N_y^+, N_y^-$ | Shape Matching Value N* |
|---|---|---|---|---|
| 1 |  | + − <br> + − | 1,1 <br> 1,1 | 4 |
| 2 |  | + + − <br> + + − | 2,1 <br> 2,1 | 9 |
| 3 |  | + + − − <br> + + − | 2,2 <br> 2,1 | 12 |
| 4 |  | + + − − <br> + + − − | 2,2 <br> 2,2 | 16 |
| 5 | 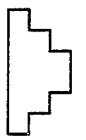 | + − − − <br> + + + − − − | 1,3 <br> 3,3 | 24 |
| 6 |  | + + − + − <br> + + − + − − | 3,2 <br> 3,3 | 24 |

TABLE 1-continued

| No. | Shape Pattern | Pulse Array (Top Row: X) (Bottom Row: Y) | Characteristic Value $N_x^+, N_x^-$ $N_y^+, N_y^-$ | Shape Matching Value $N^*$ |
|---|---|---|---|---|
| 7 |  | + + − + − − <br> + + − + − − | 3,3 <br> 3,3 | 36 |

Accordingly, in step 130, the shape matching value $N^*$ is computed for the figure input pattern from the characteristic values $N_x^+$, $N_x^-$, $N_y^+$ and $N_y^-$ by the use of an arithmetic operational formula. Then, in steps 140 and 150, recognition of the input figure pattern is achieved by comparing and confirming the coincidence of the computed shape matching value $N^*$ with the standard shape matching value $N^*$ stored beforehand for each figure pattern. In case coincidence is not obtained between the two kinds of shape matching values $N^*$ in their comparison in steps 140 and 150, then it is considered that the input figure is not included among the figure patterns stored beforehand, that is, it is impossible to recognize (step 190).

At this point, processing details of steps 120 and 130 will be described by reference to FIG. 5.

Having proceeded to step 120 following completion of the binary coding procedure in step 110, the shape discerning device 11 proceeds next to step 1203 after setting the i and j registers to 1 to indicate the X and Y axes as the initialization (step 1201). It should be noted that in the initial set-up procedure in step 1201, processing is also carried out, though not shown in the figure, for clearing the contents of each of the registers X(i), Y(j), AREA, n, FDX, FDY, $N_x^+$, $N_x^-$, $N_y^+$, $N_y^-$, $N^*$, and so on, to be described later.

In the processing between step 1203 and step 1223, formation of histograms for the projected figures of the figure pattern to be recognized, like the one in FIG. 4, with each of the X and Y axes as the base, is carried out by discriminating the level state (the portions inside the projected figure are at the high level "1", while the portions outside the projected figure are at the low level of "0") of each coordinate point f(i, j) represented by the registers i and j in the rectangular coordinate system shown in FIG. 4.

First, the operational processing of the histogram with the X axis as the base will be described. Proceeding to step 1203 following the initialization in step 1201, whether it is on level "1" or "0" is discriminated regarding the coordinate f(1, 1) which represents the coordinate of f(i, j) at the start of discrimination, corresponding to the initially set values of the registers i and j. Here, the coordinate f(1, 1) corresponds to the origin of the coordinate system which is the starting point for the X and Y axes. If the result of discrimination indicates that f(1, 1) is on the high level, that is, if it is found in the projected figure, it proceeds to step 1205 where the register X(i) (here it is equal to X(i=1), which represents the frequency of being found in the projected figure (high level "1") for each x coordinate i, is increased incrementally. In addition, the register AREA, which represents the area of the figure pattern, is increased incrementally before proceeding to step 1206. In step 1206 it is confirmed that the histogram operation with X axis as the base is now in progress, and after that, it proceeds to step 1207 in order to set the coordinate to be discriminated next. In step 1207, only the Y axis value represented by the register j is varied by incrementally increasing the content of the register j, for the points on the line corresponding to the x register i at that time. In concrete terms, it is desired to have f(1, 2) after the processing in step 1207 if the coordinate was f(1, 1) before the processing. Proceeding to step 1209 after this, it discriminates whether the value of the register j reached the maximum value Ymax of the Y axis. If it is found that j>Ymax holds as a result of the discrimination, it is judged that the variation of the Y value on the line corresponding to that value of X has reached its limit, that is, that the determination of the frequency of occurrence on that line has been completed. Then, proceeding to step 1211, it is arranged to increase incrementally the content of the register i as well as to reset the register j to 1, in order to start anew discrimination processing in the next step 1203 for the line corresponding to the X value adjacent to, and on the side of the maximum value Xmax, relative to the line for which the processing has just been completed. In concrete terms, it is desired to have f(2, 1) after the processing in step 1211 if the coordinate was f(1, Ymax) before the processing. Here, if j>Ymax does not hold in step 1209, it goes back directly to step 1203 in order to continue to find the frequency on the line corresponding to the same value of X. Proceeding to step 1213 upon completion of the processing in step 1211, discrimination is made whether the content of the incrementally increased register i exceeded the maximum value Xmax for the X axis. If it is found that i>Xmax holds, it signifies that the frequency operation has been completed for all lines in the entire range of X values so that a command is issued to carry out the operational processing for the histogram with the Y axis as the base, as well as resetting the registers i and j to the initial value 1 to go back to step 1203. Now, if i>Xmax does not hold, it goes back directly to step 1203 by judging that the preparation of the histogram with the X axis as the base is not yet completed.

In this manner, it is possible to obtain the frequency for all values in the entire range of the X axis, that is, the histogram with X axis as the base, by repeating the processings between step 1203 and step 1215.

Next, the operational processing for the histogram with the Y axis as the base will be described. Going back to step 1203 after setting the proscribed switches in step 1215, discrimination whether it is "1" or "0" is made of the level of the coordinate f(1, 1) which represents the coordinate f(i, j) for the initially set values of the registers i and j. If it is found that f(1, 1) is on the high level "1" as a result of the discrimination, that is, that it is located within a portion of the projected figure, it proceeds to step 1205. There the register Y(j) (here it is equal to Y(j=1)), which represents the frequency of occurrence of the portion of the projected figure (high level "1") for each value j for the Y axis, is increased incrementally, as well as incrementally increasing the register AREA, which represents the area of the figure pattern, before proceeding to step 1206. If f(1, 1) is found to be on the low level "0" in step 1203, then it proceeds directly to step 1206. In step 1206, after confirming that the operation for obtaining the histogram with the Y axis as the base is in progress, it proceeds to step 1217 in order to set the coordinate to be discriminiated next. In step 1217, only the x value which is represented by the register i is varied by incrementally increasing the content of the register i, on the line corresponding to the present value of the register j. In concrete terms, it is desired to have f(2, 1) after the processing in step 1217 if the coordinate was f(1, 1) before the precessing. Following this, it proceeds to step 1219 to discriminate whether the value of the register i reached the maximum value Xmax for the X axis. If it is found the j>Xmax holds as a result of the discrimination, then it proceeds to step 1221 by judging that the variation of the X value on a line with given Y value has reached its limit, that is, the finding of the frequencies on that line has been completed. In step 1221, the content of the register j is increased incrementally and the register i is reset to 1 in order to start anew a discrimination precessing in the next step 1223 for the line located adjacent to, and on the side toward the line for the maximum value Ymax, with respect to the line for which the discrimination has just been completed. In concrete terms, it is desired to have the coordinate f(1, 2) after the processing in step 1221, if it was f(Xmax, 1) before the processing. If j>Xmax does not hold in step 1219, then it goes back directly to step 1203 to continue the frequency determination for the line with the same Y value as before. Upon completion of the processing in step 1221, it proceeds to the next step 1223 where discrimination is made regarding whether the content of the register j that has been increased incrementally exceeded the maximum value Ymax for the Y axis. When j Ymax holds, it means that the frequency operation for all of the lines in the entire range of the Y axis has been completed. If, on the other hand, j Ymax does not hold, it goes back directly to step 1203 by judging that the preparation of a histogram with the Y axis as the base is not yet completed.

Therefore, by repeating the processings from step 1203, through steps 1206 and 1217, to step 1223, it is possible to obtain a frequency determination for all lines in the entire range of the Y axis, that is, the histogram with the Y axis as the base. As a result, combined with the histogram with the X axis as the base obtained previously, the operational processings for the histograms for the figure pattern projected on the rectangular coodinate axes shown in FIG. 4 are completed.

Next, in step 1225 through step 1249, the differentiation operation and the operational processing for the characteristic values $N_X^-$, $N_X^+$, $N_Y^-$, and $N_Y^+$ are carried out based on the histograms with the X and Y axes as the bases obtained in step 1203 through step 1223.

Thus, following arrival in step 1225 the program proceeds to step 1227 after resetting the value of the register n to 1. In step 1227, the frequency difference FDX for the neighboring X coordinates (n and n+1) is calculated using the frequency X(i) found for each X coordinate i. Here, the operation will be carried out to find the frequency difference FDX between X(2) and X(1) since it corresponds to immediately after the resetting of the register n. In the next step 1229, the content of the register LEN, which shows the periphery length of the figure pattern, is added to the absolute value of the frequency difference FDX found in the above.

Proceeding to step 1231, after confirming that the absolute value of the calculated frequency difference FDX reached a prescribed value P, the sign of the frequency difference FDX is discriminated (step 1233) to have the characteristic value $N_X^+$, increased incrementally in step 1235 if it is positive, or to have the characteristic value $N_X^-$, increased incrementally in step 1237 if it is negative. Further, if the frequency difference FDX is found to be less than P in step 1231, such a value is excluded from the evaluation of $N_X^+$ and $N_X^-$ by judging that it represents the component of some sort of noise or other electrical disturbance.

The evaluation of the characteristic values $N_Y^+$ and $N_Y^-$ for the Y axis are carried out later in step 1239 through step 1249 in a manner similar to the case for the X axis.

With the completion of one round of a series of the characteristic values $N_X^+$, $N_X^-$, $N_Y^+$, and $N_Y^-$ for the X and Y axes, the processing proceeds to step 1251. In step 1251, discrimination is made regarding whether the register n reached the maximum value Max (here, for convenience of explanation, it is assumed that Xmax=Ymax, and for example, n max=n max−1, n max=-Max f(i−1, j)=Max f(i, j−1)). If it is found that n=Max does not hold as a result of this discrimination, then it proceeds to step 1253 where the register n is increased incrementally, and goes back to step 1227 in order to continue the differentiation processing and the evaluation of the characteristic values by shifting the lines respectively toward the maximum values Xmax and Ymax. Therefore, in the loop of processing from step 1225 through step 1253, evaluation is made of the characteristic values for the entire ranges of the X and Y axes based on the results for the frequency differences FDX and FDY evaluated for the entire ranges of both X and Y axes.

When it is detected in step 1251, after repetition of this series of processings, that n=n max holds, indicating that the differentiation processing and the characteristic value evaluation for the entire ranges of the X and Y axes are completed, it proceeds to step 1255 where the shape matching value N* is evaluated using such an arithmetic operational formula as shown earlier, and then proceeds to the next step 140 where the comparison processing for the pattern is to be made.

TABLE 2

| No. | Shape Pattern | Pulse Array (Top Row: X(x)') (Bottom Row: Y(y)) | Characteristic Value Nx,Nx Ny,Ny | Shape Matching Value N* |
|---|---|---|---|---|
| 1 |  | + − + − <br> + + − − | 2,2 <br> 2,2 | 16 |
| 2 |  | + + + − − − <br> + + − + − − | 3,3 <br> 3,3 | 36 |

With such a recognition system as described in the foregoing, it is possible to discriminate various figure patterns as shown in Table 1. However, the figure patterns shown in Table 2, though they are simple geometric figures, have the same characteristic value with the patterns No. 4 and No. 7, respectively, of Table 1 so that discrimination between the corresponding patterns according to the foregoing system becomes inoperative when those patterns exist as a mixture.

To resolve such a problem it is necessary only to employ either one or a combination of a plurality of the methods to be described below (step 160).

A first of these is the method to discriminate the figure pattern by the use of the periphery length of a figure pattern which can be found in a simple manner as follows.

Due to the fact that the derivatives of the projected figures 20X and 20Y in FIG. 4 can be found in the stage where the figure data are binary coded, they can be obtained as the finite differences between the adjacent projected values. When the projected figures on the X and Y axes are those of the projected figures 20X and 20Y of FIG. 4, the values of the finite differences are as shown in Tables 3 and 4.

Noting that the periphery length of the figure pattern is given by the total sum of the absolute values of the finite differences, the length can be found without complicated operations from the derivative values (the values of the finite differences) obtained by differentiating the projected figures in the process of extracting the characteristic values as described earlier. Using the periphery length as a second characteristic value it becomes possible to discriminate those figures that could not be discriminated by the use of the shape matching value N*.

TABLE 3

| X Coordinate | Projected Value | Positive and Negative Pulse | Values of Finite Difference |
|---|---|---|---|
| X | 0 | + | 3 |
| X | 3 |   | 0 |
| X | 3 | + | 4 |
| X | 7 |   | 0 |
| . | . |   | . |
| . | . |   | . |
| . | . |   | . |
| X | 7 | − | −4 |
| X | 3 |   | 0 |
| X | 3 | − | −3 |
| X | 0 |   |   |

A second method is one which utilizes the position of the center of gravity of the figure pattern for the discrimination. The positions of the center of gravity along the directions of the X and Y axes can be found respectively from the binary coded figure patterns by the use of simple mathematical formulas. By the use of the positions of the center of gravity $X_G$ and $Y_G$, divided as necessary by the maximum widths of the figure pattern $X_1$ and $Y_1$, respectively, to normalize them, as a second set of characteristic values, it becomes possible to carry out matching for those figure patterns that cannot be done so with the shape matching value N*.

TABLE 4

| X Coordinate | Projected Value | Positive and Negative Pulse | Values of Finite Difference |
|---|---|---|---|
| y | 0 | + | 6 |
| y | 6 |   | 0 |
| y | 6 | + | 4 |
| y | 10 |   | 0 |
| y | 10 |   | 0 |
| y | 10 | − | −4 |
| y | 6 |   | 0 |
| y | 6 | − | −6 |
| y | 0 |   |   |

A third method is to discriminate the figure pattern by the use of its area which can be found easily again by integrating the projected figures. Therefore, with the area as a third characteristic value, it becomes possible to match those figure patterns that cannot be done so by the use of the shape matching value N*.

The matching of the figure patterns shown in Table 2 can be done by the use of the periphery length. These figure patterns will become matchable also by the use of the positions of the center of gravity or the area, provided that the sizes of their various parts are unequal (steps 170 and 190).

In the foregoing discussion, it is a prerequisite to have the figure patterns aligned beforehand with respect to their postures, as was mentioned earlier. Even under such a requirement it is conceivable to have four different postures with the phase differences of multiples of 90° for figure patterns with an approximate form of a rectangle. That is, the objects to be recognized are geometrical figures like the punched parts that are supplied to the bending machine, having figure patterns constructed in a closed loop form mainly with lines parallel and perpendicular to a certain line. Prior to their being supplied to the machine, these parts are aligned with respect to their postures by means of a guide. The means for aligning the posture suffices if it is the kind, as has been very widely in general use, which aligns the parts into a set of several different postures by letting the parts, that are being transported on a conveyor in arbitrary postures, hit the guide that is installed in their passage way. Thus, for example, when the parts have roughly the shape of a rectangle, they can be aligned to four kinds of postures with phase shifts of 90°, by having one or another of the four sides of the rectangle align with the guiding line. For this reason, in order to make a contribution to the automatic supply of the recognized parts to a machine such as the bending machine, a posture recognition for these parts is carried out as will be described below (step 180).

The posture recognition of a figure pattern is characterized by the following series of operations. A figure pattern which is given one of its several possible postures by means of the guide, is detected by the pattern input device 5 and is binary coded. The binary coded figure data thus obtained is transformed to the projected figures for the mutually orthogonal two axes by the shape discerning device 11. By counting the positive and negative pulses occurring in the differentiated waveforms obtained by differentiating these projected figures, the posture recognition of the figure pattern is carried out based on the regularity with which the pulse numbers vary in accordance with the posture of the figure pattern.

Thus, in this method of recognizing the posture of a figure pattern, use is made of the characteristic values $N_X{}^+$, $N_X{}^-$, $N_Y{}^+$ and $N_Y{}^-$ that can be found by counting the numbers of the positive and negative pulses in the differentiated waveforms of the projected figures on the X and Y axes. A particular use is made in this method of a certain regularity with which these characteristic values vary in accordance with the posture of the figure pattern.

It is to be noted that the fact that the characteristic values of a figure pattern vary with its posture should be duly taken into consideration when matching of the shape is to be made for a supply of parts which is a mixture of a plurality of parts with different shapes.

The above variation of the characteristic values of a figure pattern has a regularity that changes with a certain relationship that corresponds to the posture of the figure pattern. For example, for the figure pattern No. 3 of Table 1, the characteristic values vary as shown in Table 5. The characteristic values shown in Table 5 are those corresponding to the figure patterns that can be obtained by rotating it clockwise in steps of 90°, with the figure in Table 1 (rotation angle of 0°) as the reference.

TABLE 5

| Angle of rotation | $N_x{}^+$ | $N_x{}^-$ | $N_Y{}^+$ | $N_Y{}^-$ |
|---|---|---|---|---|
| 0° | 2 | 2 | 2 | 1 |
| 90° | 1 | 2 | 2 | 2 |
| 180° | 2 | 2 | 1 | 2 |
| 270° | 2 | 1 | 2 | 2 |

The variation of the characteristic values corresponding to the posture of the figure pattern given above is a special realization of a more general relationship shown in Table 6. Table 6 gives the characteristic values for each posture with the characteristic values for the case of 0° of angle of rotation as a, b, c and d.

TABLE 6

| Angle of rotation | $N_x{}^+$ | $N_x{}^-$ | $N_Y{}^+$ | $N_Y{}^-$ |
|---|---|---|---|---|
| 0° | a | b | c | d |
| 90° | d | c | a | b |
| 180° | b | a | d | c |
| 270° | c | d | b | a |

By utilizing the characteristic values that have such a regularity of variation, it becomes possible to match the posture of a figure pattern by identifying the angle of rotation for which the manner of occurrence of the characteristic values as given by Table 6 agrees with the manner for the figure pattern detected.

Namely, for the figure patterns such as the parts supplied to the image pickup device 5, it is possible to know beforehand not only about the characteristic values for the reference postures but also about the characteristic values for each posture corresponding to the changes in angle of rotation of multiples of 90° from the relations given in Table 6. By storing this information in the shape matching device beforehand, it is possible to recognize the posture of the figure patterns by comparing them with the characteristic values detected from the figure pattern supplied.

Next, another embodiment of the recognition processing will be described by referring to FIG. 6. In this device, the construction is the same, but the processing in the shape discerning device 11 is different, from the device given by FIGS. 1 and 2.

Basically, this recognition processing is carried out by transforming in the shape discerning device the binary coded figure pattern that was detected by the pattern input device to projected figures for the mutually perpendicular two axes, and by counting the number of neighboring plurality of pulses existing in the differentiated waveforms that are obtained by differentiating the projected figures, for each possible combination in the arrangement of the positive and negative signs. Recognition of a figure pattern is made by utilizing these counted numbers as the characteristic values for the figure pattern.

Here, the special feature of this method of recognizing a figure pattern exists in the use of shape selection values which can be defined as the numbers that can be evaluated from these characteristic values by means of the arithmetic operational formulas or as the numerical values constructed by assigning these characteristic values to each different digit.

Further, it is presumed here, as for the case in the previous embodiment, that the supply of the figure patterns is made after alignment of the figure postures.

Now, for a plurality of pulses in the differentiated waveform of the projection on the X axis of a figure pattern which has been read out by the pattern input device 5 (step 200) and binary coded (step 210), the frequency of occurrence of a plurality of neighboring pulses with the same array of positive and negative signs is determined for each possible combination of the array of signs. A set of these frequencies of occurrence will now be defined as a new set of characteristic values for the pattern.

In more concrete terms, for example, there are four combinations ++, +−, −+ and −− as the possible arrays of signs for a pair of adjacent pulses. For the pulses in the differentiated waveforms in FIG. 4, for example, the frequencies of occurrence of these sign arrays, namely, the characteristic values, are 1, 1, 0, 1, corresponding to both of the X and Y axes. If the characteristic values obtained from the differentiated waveform of the projected figure on the X axis are called $M_X{}^{++}$, $M_X{}^{-+}$, $M_X{}^{-+}$, and $M_X{}^{--}$, and similarly, $M_Y{}^{++}$, $M_Y{}^{+-}$, $M_Y{}^{-+}$ and $M_Y{}^{--}$ for the Y axis, the characteristic values for the various figure patterns shown in Table 7 are as given in the third column of the table.

Table 7 gives various figure patterns, the pulse arrays that occur in the differentiated waveforms of the projected figures on the X and Y axes, the characteristic values obtained from these pulse arrays, and the shape selection values calculated from these characteristic values. As seen from the table, generally speaking, the various figure patterns show some difference in their characteristic values, and hence, it becomes possible to recognize and discern the figure patterns by the use of these characteristic values (step 230).

TABLE 7

| No. Figure Pattern | Pulse Array | Characteristic Value | | | | Shape Selection Value | |
|---|---|---|---|---|---|---|---|
| | | $M^{++}$ | $M^{+-}$ | $M^{-+}$ | $M^{--}$ | According to (1)–(3) | According to (5),(6),(3) |
| 1 | X+− | 0 | 1 | 0 | 0 | $M_X{}^*$ 0 | 0 1 0 0 |
| | Y+− | 0 | 1 | 0 | 0 | $M_Y{}^*$ 0 | 0 1 0 0 |
| | | | | | | $M^*$ 0 | 0 2 0 0 |
| 2 | X++− | 1 | 1 | 0 | 0 | $M_X{}^*$ 0 | 1 1 0 0 |
| | Y++− | 1 | 1 | 0 | 0 | $M_Y{}^*$ 0 | 1 1 0 0 |
| | | | | | | $M^*$ 0 | 2 2 0 0 |

TABLE 7-continued

| No. Figure Pattern | Pulse Array | Characteristic Value $M^{++}$ | $M^{+-}$ | $M^{-+}$ | $M^{--}$ | | Shape Selection Value According to (1)–(3) | According to (5),(6),(3) |
|---|---|---|---|---|---|---|---|---|
| 3 | X++−− | 1 | 1 | 0 | 1 | $M_X^*$ | 1 | 1 1 0 1 |
|   | Y++−  | 1 | 1 | 0 | 0 | $M_Y^*$ | 0 | 1 1 0 0 |
|   |       |   |   |   |   | $M^*$   | 1 | 2 2 0 1 |
| 4 | X+−+− | 0 | 2 | 1 | 0 | $M_X^*$ | 2 | 0 2 1 0 |
|   | Y++−  | 1 | 1 | 0 | 0 | $M_Y^*$ | 0 | 1 1 0 0 |
|   |       |   |   |   |   | $M^*$   | 2 | 1 3 1 0 |
| 5 | X++−− | 1 | 1 | 0 | 1 | $M_X^*$ | 1 | 1 1 0 1 |
|   | Y++−− | 1 | 1 | 0 | 1 | $M_Y^*$ | 1 | 1 1 0 1 |
|   |       |   |   |   |   | $M^*$   | 2 | 2 2 0 2 |
| 6 | X+−+− | 0 | 2 | 1 | 0 | $M_X^*$ | 2 | 0 2 1 0 |
|   | Y++−− | 1 | 1 | 0 | 1 | $M_Y^*$ | 1 | 1 1 0 1 |
|   |       |   |   |   |   | $M^*$   | 3 | 1 3 1 1 |

In carrying out the recognition of the figure patterns by means of these characteristic values, it becomes possible, as will be described below, to avoid the necessity of going through a complicated matching processing which is being used in general pattern recognition techniques, and to simplify drastically the matching procedure by the use of the shape selection values that can be obtained from the arithmetic operational formulas involving the characteristic values.

As arithmetic operational formulas for determining the shape selection values one may employ, for example, the following expressions:

$$M_X^* = (M_X^{++} \cdot M_X^{--}) + (M_X^{+-} \cdot M_X^{-+}) \quad (1)$$

$$M_Y^* = (M_Y^{++} \cdot M_Y^{--}) + (M_Y^{+-} \cdot M_Y^{-+}) \quad (2)$$

Further, as may be needed, a new shape selection value $M^*$ may be defined by $$M^* = M_X^* + M_Y^* \quad (3)$$

in terms of the shape selection values $M_X^*$ and $M_Y^*$ obtainable from the preceeding equations. Moreover, still another shape selection value $M^*$ may be defined, for example, by $$M^* = (M^{++} \cdot M^{--}) + (M^{+-} \cdot M^{-+}), \quad (4)$$

where $M^{++}$, $M^{+-}$, $M^{-+}$ and $M^{-+}$ represent the sums of the respective characteristic values corresponding to the same sign arrays, with respect to the X and Y axes.

Therefore, in step 230, the shape selection values are computed for the input figure from the arithmetic operational formulas using the characteristic values $M_X^{++}$, $M_X^{+-}$, $M_X^{-+}$, $M_X^{--}$, $M_Y^{++}$, $M_Y^{+-}$, $M_Y^{-+}$ and $M_Y^{--}$ related to the differentiated waveforms, the projected figures on the X and Y axes. In steps 240 and 250, recognition of the input figure pattern is accomplished by confirming upon comparison of the coincidence of the computed shape selection values for the figure with the reference shape selection values that have been stored beforehand for various figure patterns. In the event that no coincidence is obtained between the two kinds of shape selection values, in the comparison in step 240 and 250, it is judged that the input figure cannot be found among the figure patterns stored beforehand, or that the figure is one that cannot be recognized (step 290).

Figure 7B:
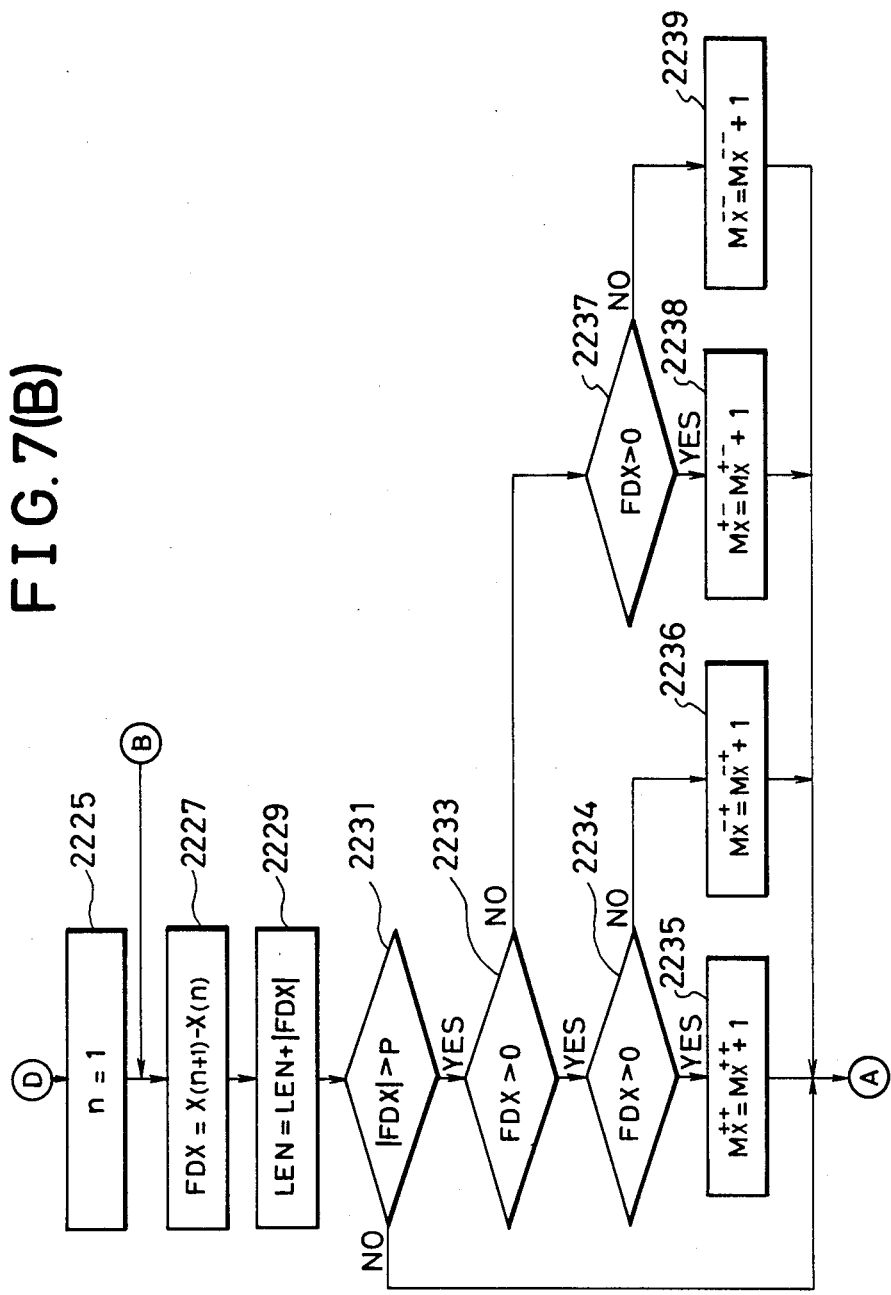

Here, the details of the processings in steps 220 and 230 will be described by referring to FIG. 7.

When it reaches step 220 following the completion of the binary coding in step 210, it proceeds to step 2203 after setting the i and j registers for the X and Y axes, respectively, to 1 as the initial values (step 2201). Further, the initial set-up processing in step 2201 includes also, though not shown, the operation for clearing the content of each of the registers X(i), Y(j), AREA, n, FDX, FDY, $M_X^{++}$, $M_X^{+-}$, $M_X^{-+}$, $M_X^{--}$, $M_Y^{++}$, $M_Y^{+-}$, $M_Y^{-+}$, $M_Y^{--}$ and others, to be described later.

Figure 5B:
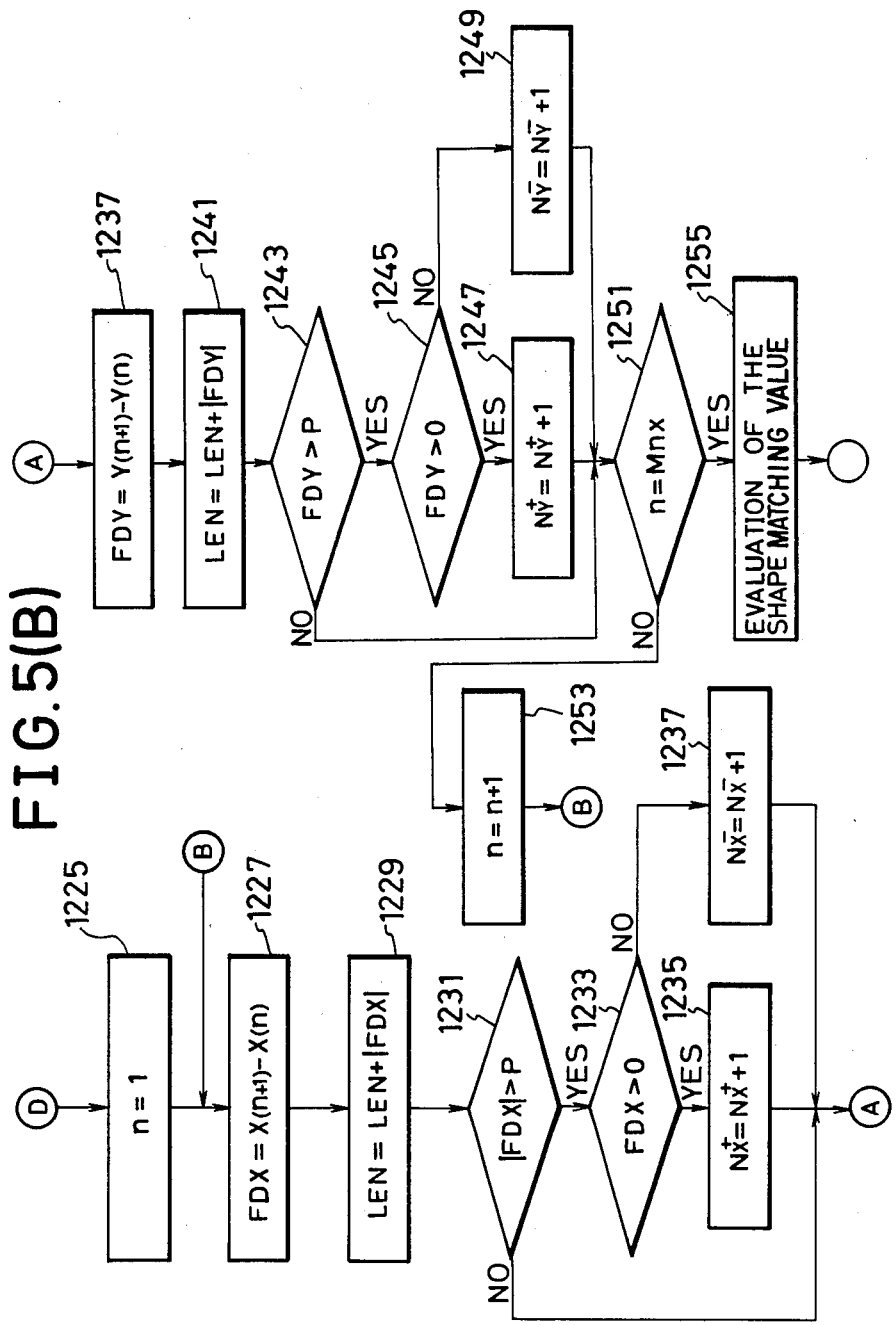

The description on the processing from step 2203 through step 2223 will not be given here since it is similar to the processing from step 1203 through step 1223 of FIG. 5 for the previous embodiment.

Next, in step 2225 through step 2251, the differentiation processing and the operational processing for the characteristic values $M_X^{++}$, $M_X^{+-}$, $M_X^{-+}$, $M_X^{--}$, $M_Y^{++}$, $M_Y^{+-}$, $M_Y^{-+}$ and $M_Y^{--}$ will be carried out based on the histograms for the X and Y axes obtained in step 2203 through 2223.

Then, arriving at step 2225, the value of the register n is reset to 1 before proceeding to step 2227. In step 2227, the frequency difference FDX for the neighboring X coordinates (n and n+1) is computed using the frequency X(i) for each X coodinate i obtained in step 2205. Here, the frequency difference FDX between X(2) and X(1) is to be computed since the register n corresponds to that value immediately after the reset. In the next step 2229, using the frequency difference FDX thus obtained, the content of the register LEN which represents the periphery length of the figure pattern is added.

Proceeding to step 2231, after confirming that the absolute value of the computed frequency difference FDX reached a prescribed value P, the sign of FDX is discriminated (step 2233) before proceeding to step 2234 if it is positive or to step 2237 if it is negative. In either of step 2234 or 2237, a prescribed characteristic value is increased incrementally by examining the sign of the previous FDX. That is, in step 2234, the characteristic value $M_X^{++}$ is increased incrementally if the previous FDX had a positive value or the characteristic value $M_X^{+-}$ is increased incrementally if it had a negative value. On the other hand, in step 2237, the characteristic values $M_X^{+-}$ and $M_X^{--}$ are increased incrementally if the previous FDX had positive and negative values, respectively. Further, if the frequency difference FDX in step 2231 is less than P, such a frequency difference is excluded from the evaluation of the characteristic values $M_X^{++}$, $M_X^{+-}$, $M_X^{-+}$ and $M_X^{--}$ by judging that it represents a noise component of one kind or another.

The evaluation of the characteristic values $M_Y^{++}$, $M_Y^{+-}$, $M_Y^{-+}$ and $M_Y^{--}$ for the Y axis are carried out in the same manner as for the X axis in the subsequent step 2240 through 2251.

With the completion of the evaluation of a series of characteristic values $M_X^{++}$, $M_X^{+-}$, $M_X^{-+}$, $M_X^{--}$, $M_Y^{++}$, $M_Y^{+-}$, $M_Y^{-+}$ and $M^{--}$ it proceeds to step 2252. The processings between step 2252 and step 2255 will not be described further since they are similar to those between step 1251 and step 1255 of FIG. 5 for the previous embodiment.

Now, in the shape recognition in accordance with the above described system, in particular with the method which utilizes the shape selection value as defined by Eqs. (1) through (3), matching of the parts becomes unfeasible between the figure patterns No. 4 and No. 5 of Table 7, for example, if they are mixed together. Such figure patterns that cannot be matched by the foregoing method become readily matchable by a method, for example, like the following.

When the numbers of the positive and negative pulses in the differentiated waveforms of the figures projected on the X and Y axes, namely, $N_X^+$, $N_X^-$, $N_Y^+$ and $N_Y^-$, are used as a second set of characteristic values, these sets are different for the two figure patterns under consideration, being 2, 2, 2, 1 for the figure pattern No. 4 whereas they are 2, 2, 2, 2 for the figure pattern No. 5, as may be found from the pulse arrays given in Table 7. Therefore, if one uses the shape matching value defined, for example, by $N^* = (N_X^+ N_X^-) + (N_Y^+ N_Y^-)$, there is obtained $N^* = 12$ for the figure pattern No. 4, whereas $N = 16$ for the figure pattern No. 5, making it possible to match these figure patterns easily.

Furthermore, it will prove effective for an accurate matching of the figure patterns to find the characteristic value $M^*$ by the following method. Namely, one needs only to define the shape selection values $M_X^*$ and $M_Y^*$, for example, by $$M_X^* = M_X^{++} \times 1000 + M_X^{+-} \times 100 + M_X^{-+} \times 10 + M_X^{--} \quad (5)$$

$$M_Y^* = M_Y^{++} \times 1000 + M_Y^{+-} \times 100 + M_Y^{-+} \times 10 + M_Y^{--}, \quad (6)$$

or may evaluate the shape selection value $M^*$ as defined by Eq. (3).

In Table 7 are given the shape selection values as computed by the use of the various equations presented hereinbefore.

Furthermore, the arithmetic operational formulas to be used for matching purposes need not be limited to those already given, but may be any formulas which take the special features of each figure pattern to be matched into consideration.

In addition, for more complicated figure patterns, use may be made, for example, of the characteristic values defined as the frequencies of occurrence of the eight kinds of sign arrays, namely, +++, ++−, +−+, +−−, −++, −+−, −−+ and −−− obtained as the possible combinations of arrays of positive and negative signs for three consecutive pulses.

With the matching and recognition systems as described above, it is possible to carry out the discrimination of the figure patterns as shown in Table 7 or other various kinds of figure patterns. However, depending upon the figure patterns, there may arise cases in which a plurality of figure patterns are assigned identical characteristic values, in which case discrimination becomes unfeasible.

In such a case, the use of the periphery length, the position of the center of gravity, or the area of the figure patterns as a second characteristic value will make the matching possible, as in the first embodiment described earlier, for those figure patterns for which the use of the above characteristic value alone does not lend itself toward the discerning of the figure patterns (step 260, 270 and 290).

In addition, it is presumed that the figure patterns are aligned beforehand regarding their postures. For figure patterns that may be regarded approximately as a rectangle, four possible postures exist with a phase difference of 90° each for which the above characteristic values are mutually different. However, certain relationships exist among the characteristic values for these four postures, so that by the use of such relationships it will become posible, as for the embodiment described earlier, to recognize the figure patterns irrespective of the postures, and moreover, to recognize their postures at the same time (step 280).

Figure 8B:
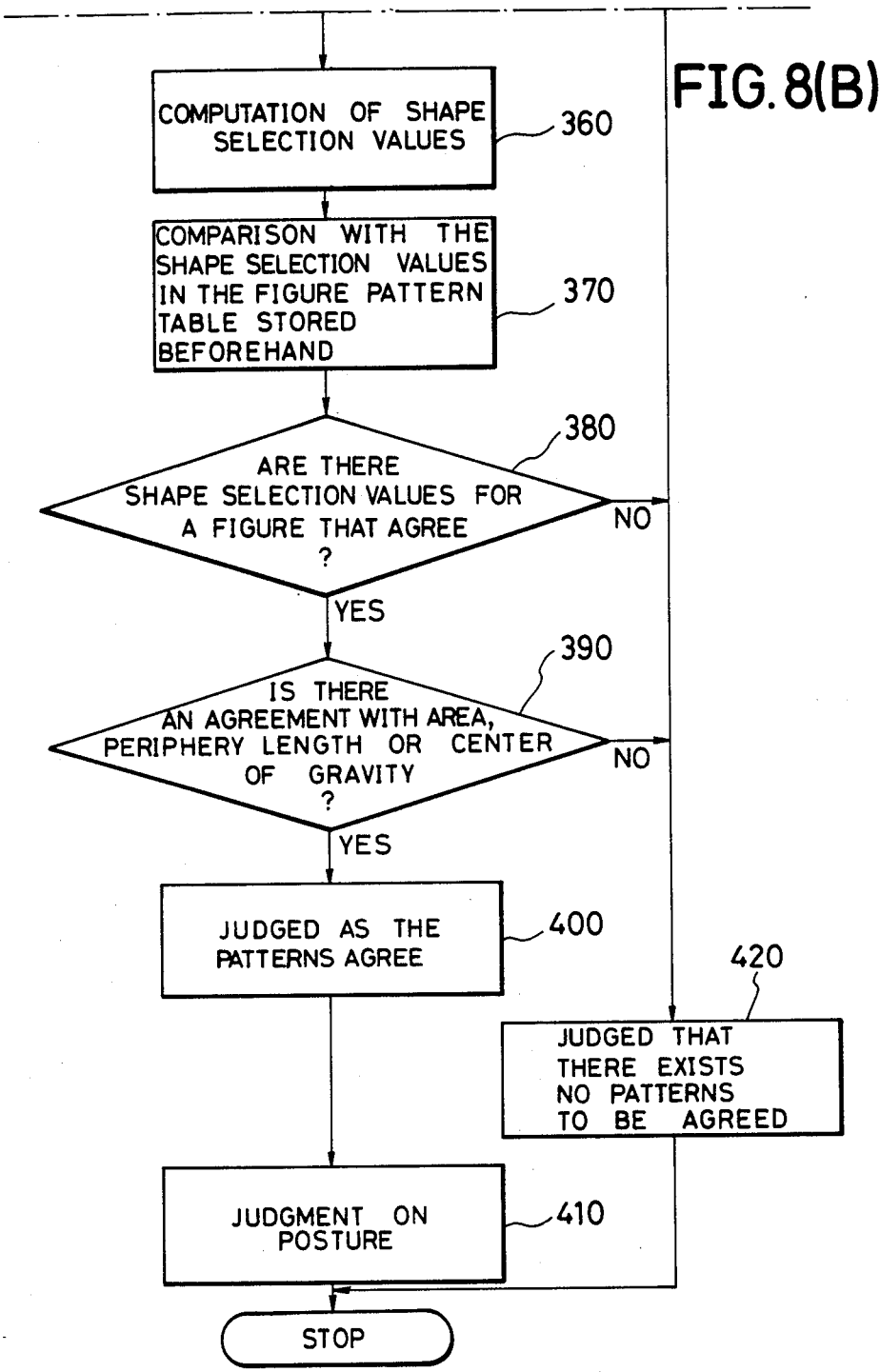

FIG. 8 shows the construction in which the processing in the two embodiments described in the foregoing are combined together. Namely, the figure pattern which is detected by the pattern input device 5 and binary coded in transformed to the figures projected on the mutually perpendicular two axes in the shape discerning device 11. Then, the characteristic values are determined as the positive and negative pulse numbers and as the values based on the neighboring plurality found in the differentiated waveforms obtained by differentiating these projected figures (step 300 to 320). The special feature of the method is to carry out the recognition of the figure patterns by the use of these characteristic values (step 330 to 420). In this case, the construction of the device is the same as shown in FIG. 1, but the processing in the shape discerning device 11 is different, as described above.

What is claimed is:

1. A pattern recognition device comprising:
   image pickup means for detecting a pattern of a figure to be identified and for producing a corresponding binary coded figure pattern;
   shape discerning means for projecting said figure pattern on mutually perpendicular X and Y axes, deriving a histogram of said figure for each of said X and Y projections, and first order differentiating said histograms along said X and Y axes to produce a series of characteristic values for said figure pattern, said characteristic values for said figure pattern being defined as a set of numbers for all possible combinations of the array of signs of the positive and negative pulses occurring in the first order differentiation waveform of said histograms; and processing means for comparing said figure pattern values to predetermined values of known figure patterns, to identify said figure to be identified.

2. The pattern recognition device of claim 1, wherein said shape discerning means further includes means for deriving, through predetermined arithmetic operational formulas, from said characteristic values, a shape matching value for use in said processing means for comparing said figure pattern shape matching value to shape matching values of known figure patterns to identify said figure to be identified.

3. The pattern recognition device of claim 2, said shape discerning means further including means for counting the number of said positive and negative pulses and posture recognition means responsive to the regularity with which said number of pulses varies in response to predetermined rotation of the posture of a known figure for identifying said figure to be identified.

4. A pattern recognition method, comprising:
detecting the pattern of a figure to be identified and producing a corresponding image signal;
producing a binary coded pattern corresponding to said figure;
projecting said binary coded pattern onto mutually perpendicular X and Y axes;
differentiating the projected pattern to produce X and Y differentiated waveforms;
obtaining from said waveforms data characteristic of said binary coded pattern, the step of obtaining data characteristic of said pattern including determining all possible combinations of the array of signs of the positive and negative pulses occurring in said waveforms and providing a set of numbers for said combinations, where each number corresponds to the frequency of occurrence of an array of positive and negative signs in a plurality of neighboring pulses in said waveforms, said set of numbers comprising said characteristic data for identification of said figure; and
comparing the data obtained from said waveforms with known data to identify said figure.

5. A pattern recognition method, comprising:
detecting the pattern of a figure to be identified and producing a corresponding image signal;
producing a binary coded pattern corresponding to said figure;
projecting said binary coded pattern onto mutually perpendicular X and Y axes;
differentiating the projected pattern to produce X and Y differentiated waveforms;
obtaining from said waveforms data characteristic of said binary coded pattern, the step of obtaining data characteristic of said pattern including determining all possible combinations of the array of signs of the positive and negative pulses occurring in said waveforms, providing a set of numbers for said combination, where each number corresponds to the frequency of occurrence of an array of positive and negative signs in a plurality of neighboring pulses in said wave forms, and determining from said set of numbers, by means of arithmetic operational formulas, shape selection values, and shape selection values comprising the characteristic data for identification of said figure; and comparing said characteristic data with known data to identify said figure.

6. A pattern recognition device comprising:
image pickup means for detecting a pattern of a figure to be identified and for producing a corresponding binary coded figure pattern;
shape discerning means for projecting said figure pattern on mutually perpendicular X and Y axes, deriving a histogram of said figure for each of said X and Y projections, and first order differentiating said histograms along said X and Y axes to produce a series of characteristic values for said figure pattern, said characteristic values for said figure pattern being defined as the frequency of occurrence of the predetermined array of the positive and negative signs of a plurality of neighboring pulses derived in the first order differentiation of said histograms, said plurality of neighboring pulses being evaluated for all possible combinations of signs, and said shape discerning means further including means for deriving, through predetermined arithmetic operational formulas, from said characteristic values, a shape matching value; and
processing means for comparing said shape matching values to predetermined values of known figure patterns, to identify said figure to be identified.

7. The pattern recognition device of claim 6, wherein said processing means compares said shape selection values to predetermined shape selection values of known figure patterns to identify said figure to be identified.

8. The pattern recognition device of claim 6, wherein said predetermined arithmetic operational formulas for deriving the shape matching values ($M_X^*$, $M_Y^*$) are as follow, $$M_X^* = (M_X^{++} \sqrt{} M_X^{--}) + (M_X^{+-} \cdot M_X^{-+})$$

$$M_Y^* = (M_Y^{++} \cdot M_Y^{--}) + (M_X^{+-i} \cdot M_Y^{-+})$$

where $M_X^{++}$, $M_X^{+-}$, $M_X^{-+}$, and $M_X^{--}$ are characteristic values obtained from the differentiated waveform of the projected figure on the X axis, and $M_Y^{++}$, $M_Y^{+-}$, $M_Y^{-+}$, and $M_Y^{--}$ are characteristic values obtained from the differentiated waveform of the projected figure on the Y axis.

9. The pattern recognition device of claim 6, wherein said predetermined arithmetic operational formulas for deriving the shape matching value are as follows, $$M^*_X = (M_X^{++} + M_X^{--}) + (M_X_{+-} - M_X^{-+})$$

$$M_Y^* = (M_Y^{++} + M_Y^{--}) + (M_Y^{+-} - M_Y^{-+})$$

$$M^* = M_X^* + M_Y^*$$

where $M_X^{++}$, $M_X^{+-}$, $M_X^{-+}$, and $M_X^{--}$ are characteristic values obtained from the differentiated waveform of the projected figure on the X axis, $M_Y^{++}$, $M_Y^{+-}$, $M_Y^{-+}$, and $M_Y^{--}$ are characteristic values obtained from the differentiated waveform of the projected figure on the Y axis, and $M^*$ is the shape selection value.

10. The pattern recognition device of claim 6, wherein said predetermined arithmetic operational formulas for deriving the shape matching values ($M_X^*$, $M_Y^*$) are as follow, $$M_X{}^* = M_X{}^{++} \times 1000 = M_X{}^{+-} \times 100 + M_X{}^{-+} \times 10 + M_X{}^{--}$$

$$M^*{}_Y{}^* = M_Y{}^{++} \times 1000 = M_Y{}^{+-} \times 100 + M_Y{}^{-+} \times 10 + M_Y{}^{--}$$

where $M_X{}^{++}$, $M_X{}^{+-}$, $M_X{}^{-+}$, and $M_X{}^{--}$ are characteristic values obtained from the differentiated waveform of the projected figure on the X axis, and $M_Y{}^{++}$, $M_Y{}^{+-}$, $M_Y{}^{-+}$, and $M_Y{}^{--}$ are characteristic values obtained from the differentiated waveform of the projected figure on the Y axis.

11. The pattern recognition device of claim 6, wherein said predetermined arithmetic operational formulas for deriving the shape matching value ($M^*$) are as follow, $$M_X{}^* = M_X{}^{++} \times 1000 = M_X{}^{+-} \times 100 + M_X{}^{-+} \times 10 + M_X{}^{--}$$

$$M_Y{}^* = M_Y{}^{++} \times 1000 = M_Y{}^{+-} \times 100 + M_Y{}^{-+} \times 10 + M_Y{}^{--}$$

$$M^* = M_X{}^* + M_Y{}^*$$

where $M_X{}^{++}$, $M_X{}^{+-}$, $M_X{}^{-+}$, and $M_X{}^{--}$ are characteristic values obtained from the differentiated waveform of the projected figure on the X axis, and $M_Y{}^{++}$, $M_Y{}^{+-}$, $M_Y{}^{-+}$, and $M_Y{}^{--}$ are characteristic values obtained from the differentiated waveform of the projected figure on the Y axis.

* * * * *

UNITED STATES PATENT AND TRADEMARK OFFICE
CERTIFICATE OF CORRECTION

PATENT NO. : 4,747,153
DATED : May 24, 1988
INVENTOR(S) : Hidehiko KOUNO et al

It is certified that error appears in the above-identified patent and that said Letters Patent is hereby corrected as shown below:

IN THE SPECIFICATION:

Column 2, line 58, "where" should be --when--.

Column 4, line 64, "24" should be --30--.

Column 6, line 47, "proscribed" should be --prescribed--.

Column 7, line 4, "precessing" should be --processing--;

line 7, "the" should be --that--;

lines 41 and 42, "coodinate" should be --coordinate--.

Column 12, line 38, "$M_X^{++}$, $M_X^{-+}$, $M_X^{-+}$, and $M_X^{--}$" should be --$M_X^{++}$, $M_X^{+-}$, $M_X^{-+}$, and $M_X^{--}$--.

Column 13, line 48, "preceeding" should be --preceding--.

Column 14, line 59, "coodinate" should be --coordinate--.

UNITED STATES PATENT AND TRADEMARK OFFICE
CERTIFICATE OF CORRECTION

PATENT NO. : 4,747,153
DATED : May 24, 1988
INVENTOR(S) : Hidehiko Kouno et al

It is certified that error appears in the above-identified patent and that said Letters Patent is hereby corrected as shown below:

Column 16, line 36, "posible" should be -- possible --.

line 44, "in" should be -- is --

Signed and Sealed this

Third Day of January, 1989

Attest:

DONALD J. QUIGG

Attesting Officer

Commissioner of Patents and Trademarks